May 20, 1969     O. H. MORK     3,444,829
PALLET CONSTRUCTION

Filed Jan. 15, 1968     Sheet 1 of 2

INVENTOR.
ORLAN H. MORK
BY
Merchant & Gould
ATTORNEYS

May 20, 1969  O. H. MORK  3,444,829
PALLET CONSTRUCTION

Filed Jan. 15, 1968  Sheet 2 of 2

INVENTOR.
ORLAN H. MORK
BY
Merchant & Gould
ATTORNEYS

United States Patent Office 3,444,829
Patented May 20, 1969

3,444,829
PALLET CONSTRUCTION
Orlan H. Mork, 6705 Southdale Road,
Edina, Minn. 55435
Filed Jan. 15, 1968, Ser. No. 698,043
Int. Cl. B65d 19/38
U.S. Cl. 108—53             4 Claims

ABSTRACT OF THE DISCLOSURE

A pallet having generally L-shaped side members pivotally attached to two opposite sides thereof each having one arm extending generally upwardly and the other arm extending inwardly to overlie a portion of the upper surface of the pallet and means attached to the side members for limiting the pivotal movement thereof so that with no load on the pallet the side members pivot outwardly a sufficient distance to allow a plurality of pallets to be stacked up in nesting relationship. Upon piling a load on the pallet the side members are pivoted inwardly by the weight of the load and form substantially upright side members so that loaded pallets can be stored in side-by-side relationship.

BACKGROUND OF THE INVENTION

*Field of the invention*

In many applications such as in warehouses, ships, and the like, pallets are utilized for transporting goods from place to place and for storage before and after transportation. In general the pallet is adapted to rest on the floor or ground and is constructed to permit the insertion of the forks of a lift truck therebeneath so that the entire load piled thereon can be lifted and moved efficiently. Also, pallets are utilized in shipping wherein cables can be threaded therethrough and attached to hoists and the like.

*Description of the prior art*

In the prior art it is the practice to form a pallet in the simplest form possible so that the pallets can be easily stacked and stored during periods of nonuse. In general these prior art pallets are simply rectangular shaped platforms having a space thereunder for the insertion of the forks of a lift truck, cables or the like. These prior art pallets are unsatisfactory for many items and especially material which is irregular or cylindrical in shape and, therefor, difficult to form into stable piles.

SUMMARY OF THE INVENTION

The present invention pertains to a pallel for carrying and storing materials including a supporting surface having a platform attached thereto so as to form openings for receiving the forks of a lift truck or the like and generally L-shaped side members pivotally attached adjacent two opposite sides of said platform with one arm extending inwardly in overlying relationship with a portion of said platform and the other arm extending generally upwardly from adjacent the outer edge of said platform, said L-shaped side members having means associated therewith for limiting the pivotal movement between a position wherein the inwardly projecting arms are generally parallel with the platform while the upwardly projecting arms are generally vertical and a second position wherein the upwardly projecting arms are pivoted outwardly so that a plurality of pallets can be stacked in nesting relationship.

It is an object of the present invention to provide a new and improved pallet for carrying and storing materials.

It is a further object of the present invention to provide a new pallet with improved sides thereon so that a greater quantity of material can be stacked thereon in a more stable fashion.

It is a further object of the present invention to provide pallets having sides thereon which pivot outwardly when no load is present on the platform so that a plurality of pallets can be stacked in nesting relationship.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
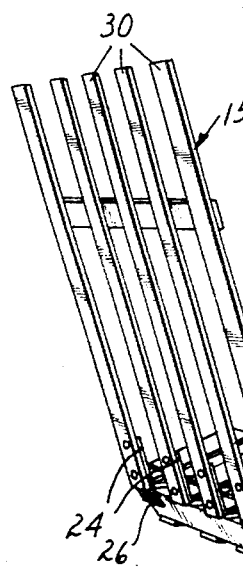
FIGURE 1 is a view in perspective of the present pallet.
Figure 5:
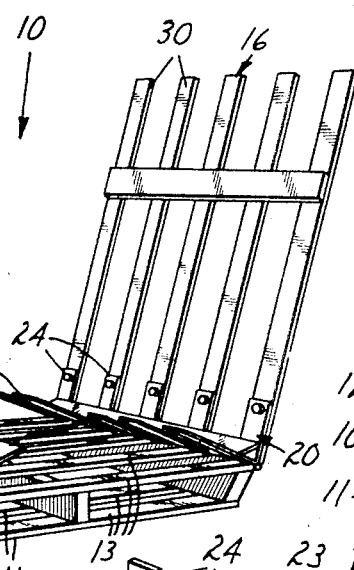
FIGURE 5 is a side elevational view of FIGURE 4.

Referring to the drawings the numeral 10 generally designates a pallet having a supporting surface 11 adapted to lie substantially flat on a floor, the ground, or the like, and a platform 12 fixedly attached to the supporting surface 11 so as to be spaced slightly thereabove. Both the supporting surface 11 and the platform 12 are formed from elongated horizontally spaced apart members 13, which are formed from some relatively rigid, light material such as wood or the like. The platform 12 is spaced from the supporting surface 11 by a plurality of larger members extending perpendicular to the members 13 and spaced apart a sufficient distance to allow the insertion of forks of a lift truck, lifting cables, or like for moving the pallet 10 and the load thereon.

Figure 6:
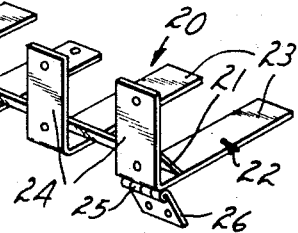
FIGURE 6 is a perspective view showing the brackets which form a portion of the side walls of the present pallet.
Figure 2:
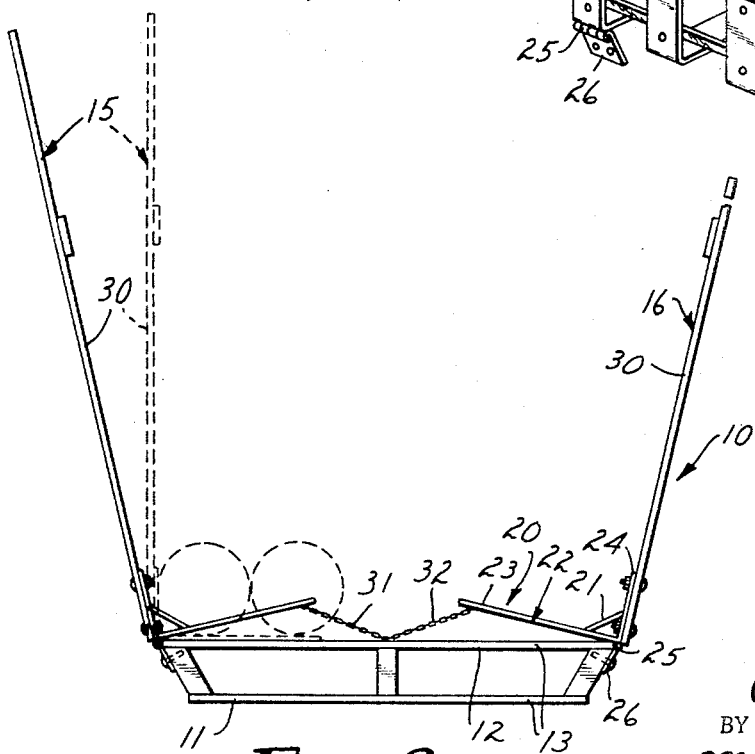
FIGURE 2 is a front elevational view of the present pallet showing two positions of the side walls.
Figure 3:
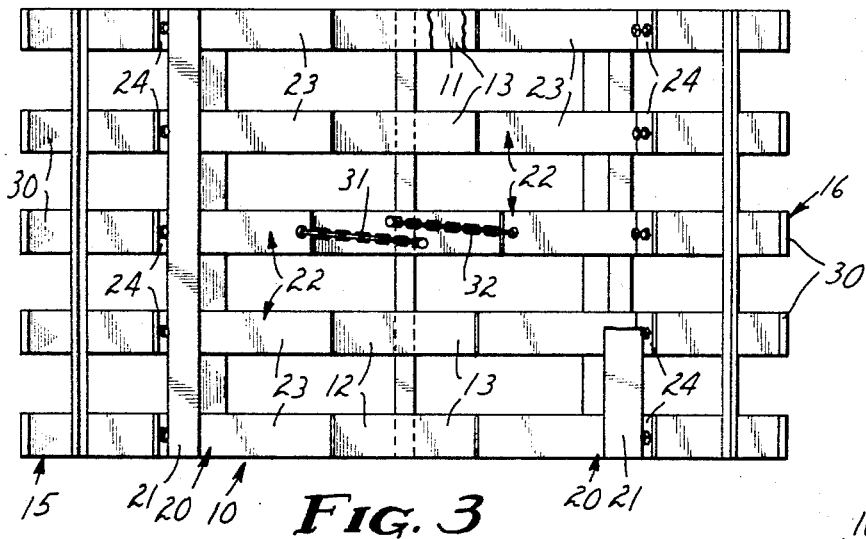
FIGURE 3 is a top plan view of the present pallet, some parts broken away.
Figure 4:
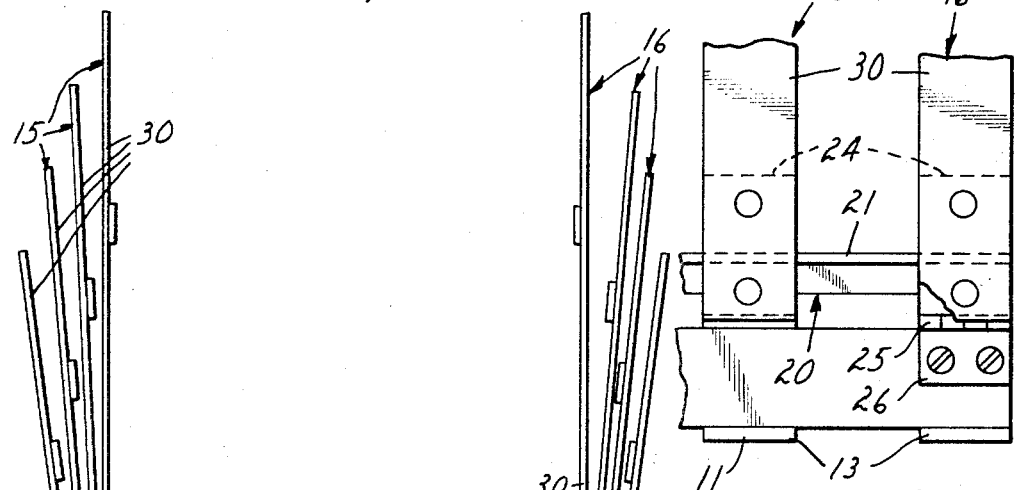
FIGURE 4 is an enlarged view showing the corner construction of the present pallet, some parts broken away.

Two side members generally designated 15 and 16 are pivotally attached adjacent two opposite sides of the platform 12. Each of the side members 15 and 16 is formed from a framework 20 (illustrated in FIGURE 6) including an elongated stringer 21 having a plurality of L-shaped brackets 22 fixedly attached thereto in spaced apart relationship along the longitudinal axis thereof. Each of the brackets 22 has a first arm 23, which has a width approximately equal to the width of the members 13 and a length somewhat greater than one-third the length of one of the members 13, and a second arm 24 approximately perpendicular to the arm 23. The brackets 22 are affixed to the stringer 21 so that they overlie the outer portion of each of the members 13 when the framework 20 is correctly positioned on the platform 12 (see FIGURE 3).

A hinge knuckle 25 is fixedly attached to the underside of the bracket 22 on either end of the stringer 21. The hinge knuckles 25 are attached adjacent the apex of the bracket 22 by some convenient means such as welding or the like and the knuckle of a hinge leaf 26 is pivotally attached to the hinge knuckle 25 in the usual manner. The hinge leaf 26 is then attached to the side of the members separating the supporting surface 11 and the platform 12 so that the arms 23 of the framework 20 overlie the members 13 and the arms 24 extend generally upwardly from the edges of the platform 12. It should be understood that a variety of mechanisms might be utilized to pivotally attach the framework 20 to the platform 12 and all such apparatus which perform the functions of this invention are within the scope thereof.

Each of the upwardly extending arms 24 of the framework 20 has an elongated member 30 fixedly attached thereto generally parallel therewith. The elongated members 30 form racks which contain material on the pallet 10. The length of each of the elongated members 30 and the material from which they are constructed is dependent upon the type of material which is being carried by the pallet 10.

Figure 7:
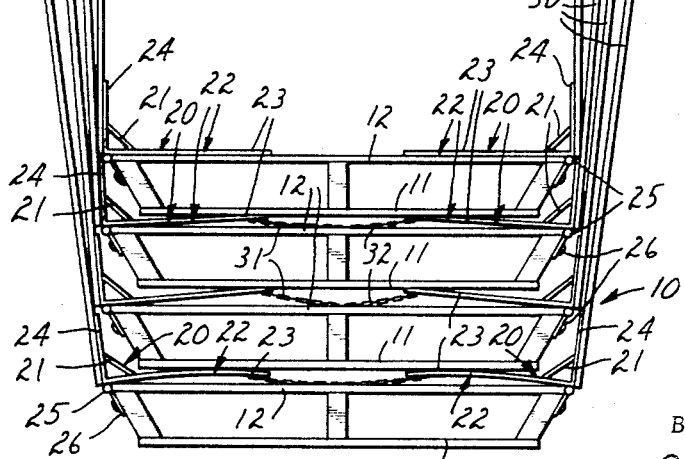
FIGURE 7 is a front elevational view showing the stacking of the pallets.

In the present embodiment the angle through which the side members 15 and 16 can pivot is limited by short lengths of chain 31 and 32 attached between the ends of one of the arms 23 of each of the framework 20 and the surface of the platform 12. The chains 31 and 32 allow the side members 15 and 16, respectively, to pivot outwardly when there is no load on the pallet 10 to a position wherein the arms 24 of the framework 20 and the attached elongated members 30 are canted outwardly from a vertical position an angle less than 90° (in this embodiment approximately 10°). It should be understood that many other means of limiting the pivotal movement of the side members 15 and 16 might be utilized, such as extending the arms 24 or elongated members 30 downwardly so the ends engage the sides of the platform 12 and supporting surface 11 upon sufficient outward rotation of the side members 15 and 16, and all such means which perform the functions of this invention come within the scope thereof. Because of this outward position of the side members 15 and 16 the pallets 10 can be stacked in a nesting relationship, as illustrated in FIGURE 7, for storage during nonuse. As material is positioned on the pallet 10 the arms 23 are moved downwardly by the load thereon so that the side members 15 and 16 are pivoted to a position wherein the arms 23 are parallel with and in juxtaposition to the platform 12 while the arms 24 and attached elongated members 30 are approximately vertical. With the arms 24 and attached elongated members 30 approximately vertical the loaded pallets 10 can be positioned in side-by-side relationship on trucks or the like for convenient transportation.

Thus, a pallet is described having side members attached thereto for maintaining a load of material correctly positioned thereon, which side members are movable so that loaded pallets can be placed in side-by-side relationship and unloaded pallets can be stored in a nesting relationship.

While I have shown and described a specific embodiment of this invention, further modifications and improvements will occur to those skilled in the art. I desire it to be understood, therefore, that this invention is not limited to the particular forms shown.

What is claimed is:

1. A pallet for carrying and storing materials comprising:
    (a) a supporting surface;
    (b) a platform attached to said supporting surface so as to form openings therebetween for receiving the forks of a lift truck therein;
    (c) generally L-shaped side members pivotally attached adjacent two opposite sides of said platform with one arm extending inwardly in overlying relationship with a portion of said platform and the other arm extending generally upwardly from adjacent the outer edge of said platform; and
    (d) means associated with said L-shaped members for limiting the pivotal movement between a position wherein the one arm of each of said L-shaped members is substantially parallel with said platform and a position wherein the upwardly extending arms are pivoted outwardly at an angle less than 90° with the perpendicular.

2. A pallet as set forth in claim 1 wherein each of the generally L-shaped side members includes an elongated stringer having a plurality of generally L-shaped brackets fixedly attached thereto in spaced apart relationship.

3. A pallet as set forth in claim 1 wherein the means for limiting the pivotal movement of the side members includes elongated flexible members attached between the inwardly extending arms and the platform.

4. A pallet as set forth in claim 1 wherein the angle through which the generally L-shaped side members pivot is sufficient to allow a plurality of pallets to be stacked together in nesting relationship.

References Cited

UNITED STATES PATENTS

| | | | |
|---|---|---|---|
| 2,471,693 | 5/1949 | Lilienfeld | 108—55 |
| 2,776,775 | 1/1957 | Averill | 108—53 |
| 2,918,242 | 12/1959 | Olivette et al. | 108—51 |
| 2,936,985 | 5/1960 | Doerr et al. | 108—55 |
| 2,956,763 | 10/1960 | D'Arca | 108—53 |

BOBBY R. GAY, *Primary Examiner.*

G. O. FINCH, *Assistant Examiner.*